Dec. 27, 1927.
G. F. MEYERS
1,653,813
VEHICLE RAISING APPARATUS
Filed Nov. 2, 1925
3 Sheets-Sheet 1
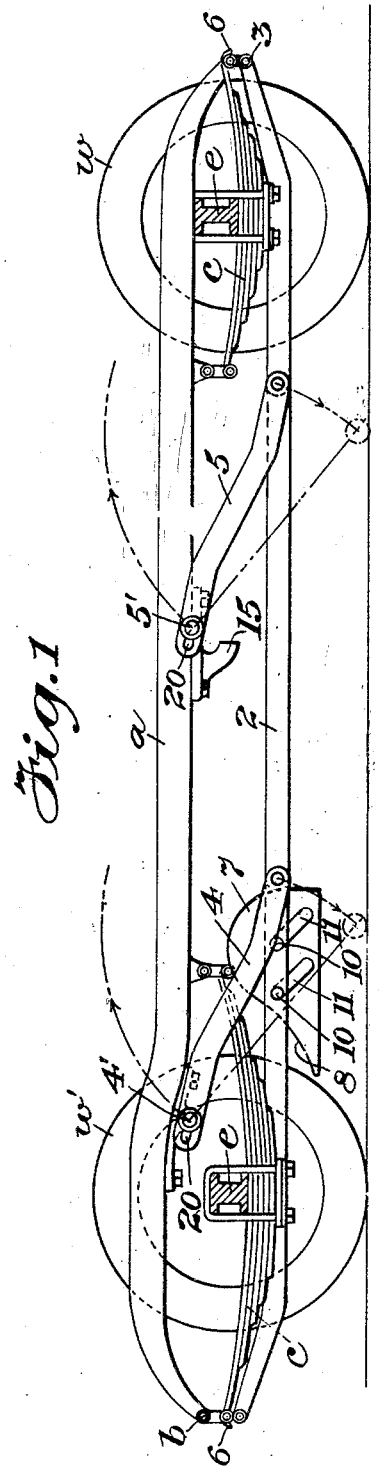
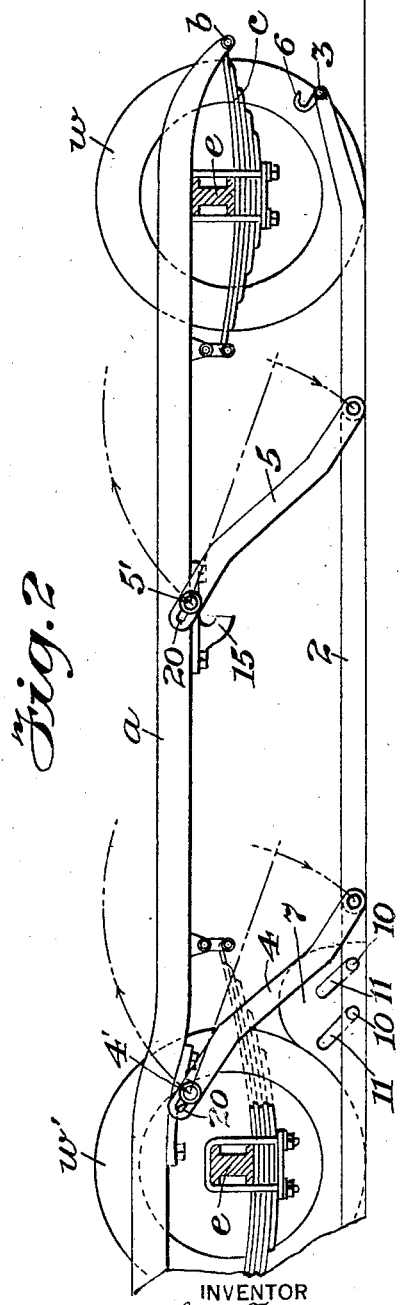
INVENTOR
George F. Meyers
BY
HIS ATTORNEY Dec. 27, 1927.  
G. F. MEYERS  
1,653,813  
VEHICLE RAISING APPARATUS  
Filed Nov. 2, 1925  
3 Sheets-Sheet 2
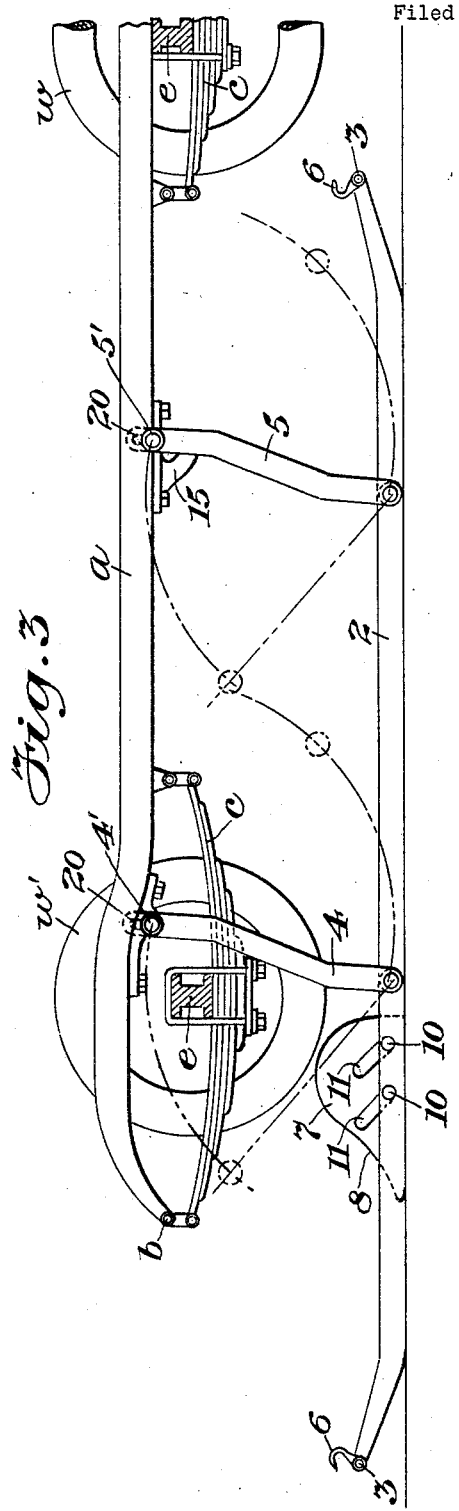
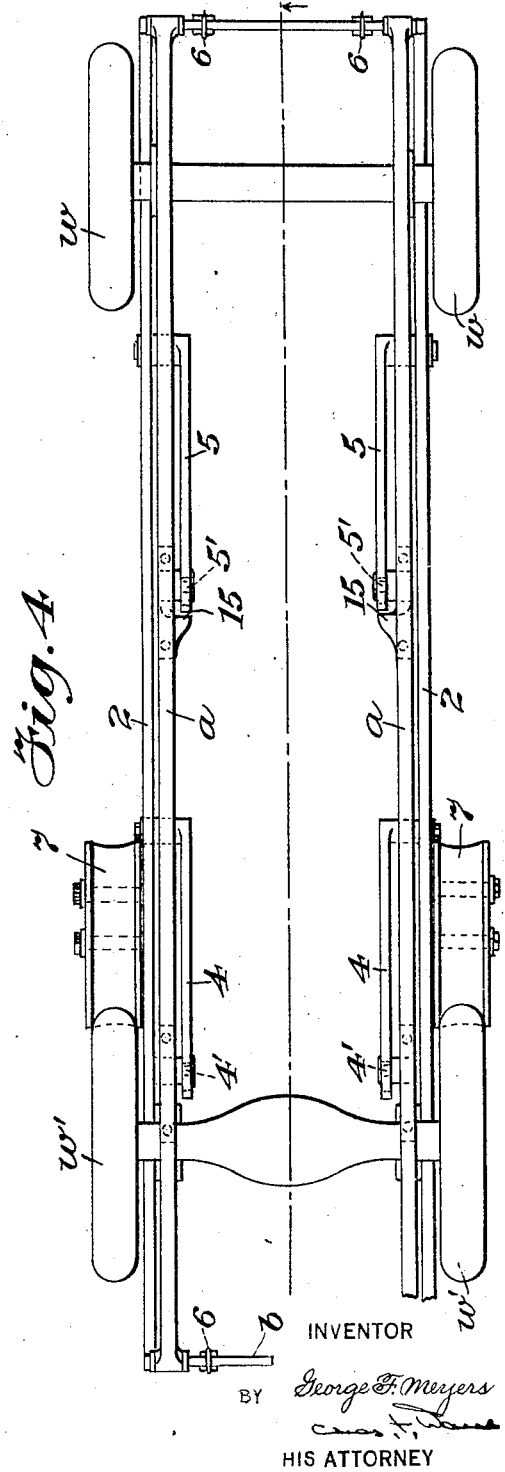
INVENTOR  
George F. Meyers  
BY  
HIS ATTORNEY Dec. 27, 1927.  
G. F. MEYERS  
1,653,813  
VEHICLE RAISING APPARATUS  
Filed Nov. 2, 1925  
3 Sheets-Sheet 3
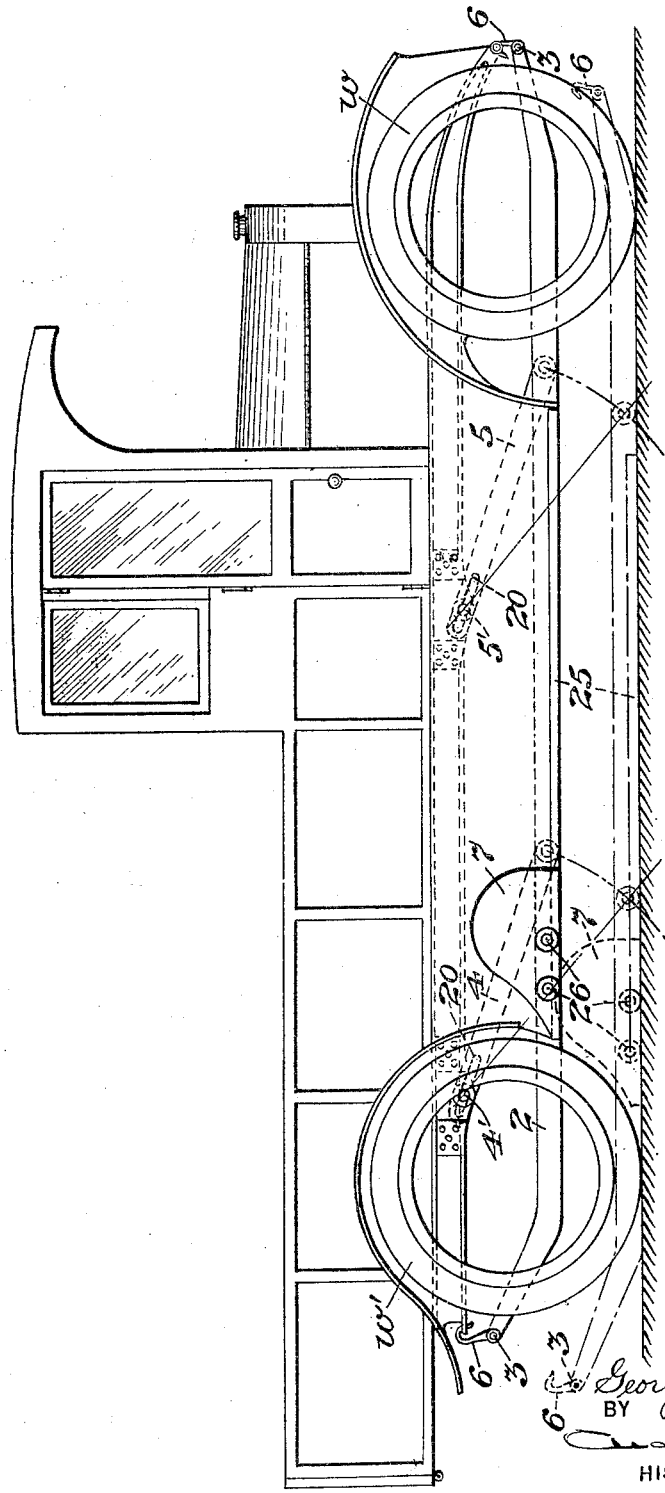
INVENTOR  
George F. Meyers  
BY  
HIS ATTORNEY Patented Dec. 27, 1927.

1,653,813

UNITED STATES PATENT OFFICE.

GEORGE F. MEYERS, OF NEW YORK, N. Y.

VEHICLE-RAISING APPARATUS.

Application filed November 2, 1925. Serial No. 66,193.

This invention relates to vehicle raising apparatus and has for its object to provide an improved raising apparatus for use in connection with automotive vehicles that may be operated from the drive wheels of the vehicle to be raised.

In carrying out my invention in a preferred form thereof, I provide an apparatus comprising a frame that is connected with the vehicle for vertical movement to and from a position in contact with the ground or other stationary support and having mounted thereon a pair of blocks formed with inclined surfaces, which blocks are adapted to be moved by the frame from a normal raised position above the ground to an operative position on the ground in front of and adjacent to the drive wheels of the vehicle, whereby they may be traversed by said wheels to effect a raising of the vehicle from the ground.

After the vehicle has been raised by the passing of the drive wheels up the inclined surfaces of the blocks, it is adapted to be held in such position to permit of convenient working beneath the vehicle. This is accomplished by connecting the block carrying frame with the chassis frame of the vehicle by links which are pivotally connected with the respective frames and are of such length that when brought to an upright position, which is accomplished by the passing of the drive wheels up the aforesaid inclined blocks, they will operate to hold the vehicle in its raised position independent of the blocks.

In case the vehicle is raised for the purpose of changing or repairing the tires on the drive wheels, it is desirable that these wheels be out of contact with the inclined blocks traversed by them in the raising of the vehicle. To effect this provision is also made for the automatic shifting of the vehicle to a position with its drive wheels out of contact with the blocks following the raising of the vehicle as effected by the passing of the drive wheels up said blocks.

Other features and advantages of the invention will be referred to in the detailed description of the invention which follows:

Referring now to the accompanying drawings forming part of this specification and in which I have shown only so much of an automotive vehicle as is necessary for the proper illustration of my invention—

Figure 1 is a longitudinal section of an automotive vehicle chassis equipped with my improved raising apparatus, the section being taken on the line 1—1 of Fig. 4. In this view the raising apparatus is shown in its lifted inoperative position.

Fig. 2 is a view similar to Fig. 1 showing the raising apparatus in its lowered operative position, preparatory to the raising of the vehicle thereby.

Fig. 3 is a similar view showing the vehicle raised.

Fig. 4 is a plan view of the vehicle as shown in Fig. 1.

Fig. 5 is a side elevation of a vehicle equipped with a raising apparatus in a slightly modified form from that shown in the other figures of the drawings.

The vehicle chassis here shown is of usual construction, the same comprising the side frame members $a$, $a$, connected by end rods $b$, $b$, and carried by spring $c$, $c$, secured to the axles $e$, $e$, which are provided with the usual front wheels $w$ and rear wheels $w'$, the latter being driven from the motor (not shown) and constituting the drive wheels of the vehicle.

My improved raising apparatus, as shown in Figs. 1, 2, 3 and 4, comprises a frame formed of two side members 2, 2, extending lengthwise of the vehicle in position just within the line of the wheels, as best shown in Fig. 4, and connected by end members 3, 3. This frame constitutes a carrying frame for certain other parts of the raising apparatus and is connected with the chassis frame by two pairs of links 4, 4 and 5, 5 which are pivotally connected at their opposite ends with the chassis and carrying frames, respectively, as shown. Normally, this carrying frame is adapted to be held in a raised position above the ground by suitable latching means, such as the pivoted hooks 6 at the end of the frame, engaging the end rods $b$, $b$, of the chassis frame as shown in Figs. 1 and 4.

Attached to the side members of the carrying frame in positions just forward of the rear drive wheels of the vehicle, are a pair of blocks 7, 7, having inclined surfaces 8 which, when positioned opposite the drive wheels, as will presently be explained, are adapted to be traversed by said wheels to raise the car from the ground. When the carrying frame is in its raised position as shown in Fig. 1, the attached blocks 7 are held thereby in a raised position off the ground. Upon the lowering of the frame, it is caused to swing rearwardly by the movement of the connecting ends of the links 4 and 5 in describing an arc about the axes of their pivots 4' and 5' respectively on the chassis frame, as indicated by broken lines in Figs. 1 and 2, which movement of the carrying frame acts to swing the attached blocks rearwardly to some extent beneath the drive wheels. The rearward movement of said blocks as thus imparted to them by the carrying frame is not sufficient however to bring them into contact with the drive wheels and I have therefore provided additional means to effect this. Such means as here shown is a camming means comprising a pair of pins 10, 10 in the side members of the carrying frame engaging the blocks within angularly disposed slots 11, 11 therein; said pins serving to hold the blocks with their lower ends projecting below the carrying frame, as in Fig. 1, whereby, upon the lowering of the frame, said blocks will strike the ground in advance of the frame, following which, the continued lowering of the frame will cause the connected pins 10 to act against the lower walls of the angular slots 11 and force the blocks rearwardly a further distance, preferably into contact with the wheels as shown in Fig. 2, so that immediately upon the starting of the motor following such positioning of the blocks 5, the drive wheels will begin their ascent of said blocks.

After the drive wheels have rolled up the blocks, during which movement the links 4 and 5 are moved by the raising of the vehicle from an inclined position to a substantially vertical one, said wheels may be stopped in a position resting on the blocks by application of the vehicle brakes (not shown) and so maintain the vehicle in raised position to permit of working thereunder. In case, however, it is desired to remove the wheels or tires, these obviously should be out of contact with the blocks. To provide for this, means are provided to permit of the vehicle, after its drive wheels have reached the top of the blocks, to be swung forward on the supporting links 4 and 5 sufficiently far to clear the wheels of the blocks 5 as shown in Fig. 3. This means comprises an arrangement of the blocks 7 and links 4—5 whereby the drive wheels of the vehicle, when moved to the high point of said blocks, will have raised the vehicle sufficiently to cause the connecting links to swing forward of their vertical centers, so that the vehicle, if not brought to a stop by the brake or other means with the wheels resting on the blocks, will automatically swing or gravitate forwardly to disengage the wheels from the blocks, as shown in Fig. 3. After the vehicle has been brought to such position, where the wheels or tires may be removed or otherwise operated upon as desired, it is adapted to be stopped by any suitable means. This means in the present case comprises a pair of bracket arms 15, 15 fixedly attached to the under side of the chassis frame members 2, 2 and which engage the links 5, 5 after the vehicle has swung forward sufficiently far to clear the wheels from the blocks, as shown in Fig. 3, and to lock the same against further forward movement. To subsequently lower the vehicle, it is only necessary to swing the same rearwardly on the pivoted supporting links 4—5 to bring the drive wheels into engagement with the blocks 7, following which the wheels will roll down the latter and so lower the vehicle to the ground. After this, the carrying frame with its supported parts may be raised again to the inoperative position shown in Figs. 1 and 4 and be there held by engaging the hooks or latch members 6 over the end members $b$ of the chassis, as shown.

It will be noted that the links 4 and 5 are provided with elongated slots 20 at their points of connection with the pivot pins 4'—5', the purpose of which is to provide for any relative movement between the links and the chassis frame that may be necessary to enable the drive wheels to properly engage with and ride over the blocks 7.

With the use of the two pairs of links, 4—5, one pair adjacent the rear end of the vehicle and the other just forward of its longitudinal center, the vehicle will be raised and lowered at both ends as shown by the cooperation of the drive wheels with the blocks 7, but if it is desired to raise and lower the rear end only of the vehicle, this of course may be accomplished by dispensing with the front pair of links 5.

In some instances I may also employ the block carrying frame as a means of support for the foot or running board of the vehicle as shown in Fig. 5, in which the running board is indicated at 25. In this case the blocks 7, instead of having a movable or pin-and-slot connection with the carrying frame as in the preceding figures, are fixedly attached thereto, as by means of screws or bolts 26. Because of such fixed connection the blocks are lowered onto the ground some distance in advance of the drive wheels as indicated by dotted lines. It therefore becomes necessary to make provision for such relative movement between the vehicle and the blocks as will enable the drive wheels to be brought into operative engagement with the blocks. This I do by making the slots 20 of sufficient length for the purpose, as shown.

The means for raising cars as herein shown and described is not only useful in connection with repairs, removal of tires, etc. but it is also useful in the raising of trucks to facilitate unloading of the same, in which event the raising blocks 7 may be of any desired height.

What I claim is:

1. In combination with an automotive vehicle having the usual drive wheels, of a raising apparatus therefor comprising a carrying member operatively connected with the vehicle for lowering and raising movements to and from a position in contact with the ground, inclined lifting blocks mounted on said carrying member for movement thereby to and from a position on the ground opposite the drive wheels to be traversed by the latter to effect a raising of the vehicle, and means for effecting a sliding movement of said blocks relatively to and lengthwise of the carrying member and in a direction toward the drive wheels upon the lowering of said blocks onto the ground.

2. In combination with an automotive vehicle having the usual drive wheels, of a raising apparatus therefor comprising a carrying member operatively connected with the vehicle for lowering and raising movements to and from a position in contact with the ground, inclined lifting blocks mounted on said carrying member for movement thereby to and from a position on the ground opposite the drive wheels to be traversed by the latter to effect a raising of the vehicle, and camming means for effecting a movement of said blocks lengthwise of the carrying member and in a direction toward the drive wheels upon the lowering of said blocks onto the ground.

3. In combination with an automotive vehicle having the usual drive wheels, of a raising apparatus therefor comprising a carrying member operatively connected with the vehicle for lowering and raising movements with respect thereto, inclined lifting blocks loosely mounted on said carrying member for movement thereby to and from a position on the ground opposite the drive wheels to be traversed by the latter to effect a raising of the vehicle, and camming means operative upon the lowering of the blocks onto the ground to effect a movement of the blocks lengthwise of the carrying frame and in a direction toward the drive wheels.

4. In combination with an automotive vehicle having the usual drive wheels, of a raising apparatus therefor comprising a carrying frame having two side members arranged lengthwise of the vehicle at opposite sides thereof, links connecting said frame with the vehicle to permit of the frame being lowered and raised to and from the ground, inclined blocks loosely connected with said side members of the frame for sliding movement relatively thereto and normally hanging below the same whereby they will contact with the ground prior to said side members, and means carried by the latter operative upon the lowering of the same following the contact of the blocks with the ground to move said blocks backwards towards the drive wheels, for the purpose set forth.

5. In combination with an automotive vehicle having the usual drive wheels, of a raising apparatus therefor comprising a block supported for movement to and from a position opposite one of the drive wheels to be traversed thereby to effect a raising of the vehicle, means operative subsequently to such raising of the vehicle to hold the same in raised position, said means including supporting members having a loose pivotal connection at one end with the vehicle and at their opposite ends engaging the ground, the said loose connection permitting of a movement of the vehicle relatively to the raising blocks, and means for holding the supporting members stationary when brought to vehicle supporting position.

6. In combination with an automotive vehicle having the usual drive wheels, of a raising apparatus therefor comprising a pair of blocks having inclined surfaces and supported for movement to and from a position with their inclined surfaces opposite the drive wheels to be traversed thereby to effect a raising of the vehicle, and means operative subsequently to such raising of the vehicle to hold the same in raised position, said means including supporting members at opposite sides of the vehicle each having a loose pin and slot connection at one end with the vehicle and at its opposite end engaging the ground, the said loose connection of the links permitting of a movement of the vehicle relatively to the raising blocks, means for holding the supporting members stationary when brought to vehicle supporting position, and means for normally holding the blocks and supporting members in raised inoperative positions.

In testimony whereof I affix my signature.

GEO. F. MEYERS.